A. M. HILLS.

LAWN MOWER.

No. 3,330. Reissued Mar. 16, 1869.

Witnesses
Thos Fusche
Wm. Trewin

Inventor.
A. M. Hills
Per Munn & Co
Attorneys.

THE NORRIS PETERS CO., PHOTO-LITHO., WASHINGTON, D. C.

United States Patent Office.

AMARIAH M. HILLS, OF HOCKANUM, CONNECTICUT.

*Letters Patent No.* 73,807; *dated January* 28, 1868; *reissue No.* 3,030, *dated July* 14, 1868; *reissue No.* 3,330, *dated March* 16, 1869.

IMPROVEMENT IN LAWN-MOWERS.

The Schedule referred to in these Letters Patent and making part of the same.

*To all whom it may concern:*

Be it known that I, AMARIAH M. HILLS, of Hockanum, in the county of Hartford, and State of Connecticut, have invented a new and improved Lawn-Mower; and that the following description, taken in connection with the accompanying drawings hereinafter referred to, forms a full and exact specification of the same, wherein I have set forth the nature and principles of my said improvement, by which my invention may be distinguished from all others of a similar class, together with such parts as I claim, and desire to have secured to me by Letters Patent.

This invention relates to a new and improved device for mowing grass by hand, and is more especially designed for mowing lawns.

The invention consists in a novel manner of constructing the frame of the machine, and mounting it on a roller, whereby the latter is made to have sufficient traction to drive, in the most efficient manner, the cutting-device.

The invention also consists in a novel manner of applying the handle to the frame of the machine, whereby the latter may be pushed along by the operator without at all affecting the equilibrium of the machine on its roller.

The invention also consists in a novel and improved cutting-device, which may be constructed at a very small cost, and still be strong, durable, and not liable to spring during the operation of cutting.

The invention further consists in a peculiar application of shoes to the device, whereby the height of the cut may be regulated as desired.

In the accompanying sheet of drawings—

Figure 1:
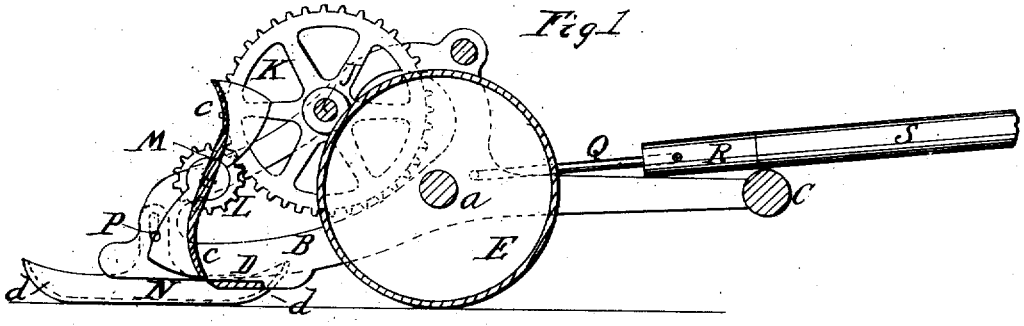
Figure 2:
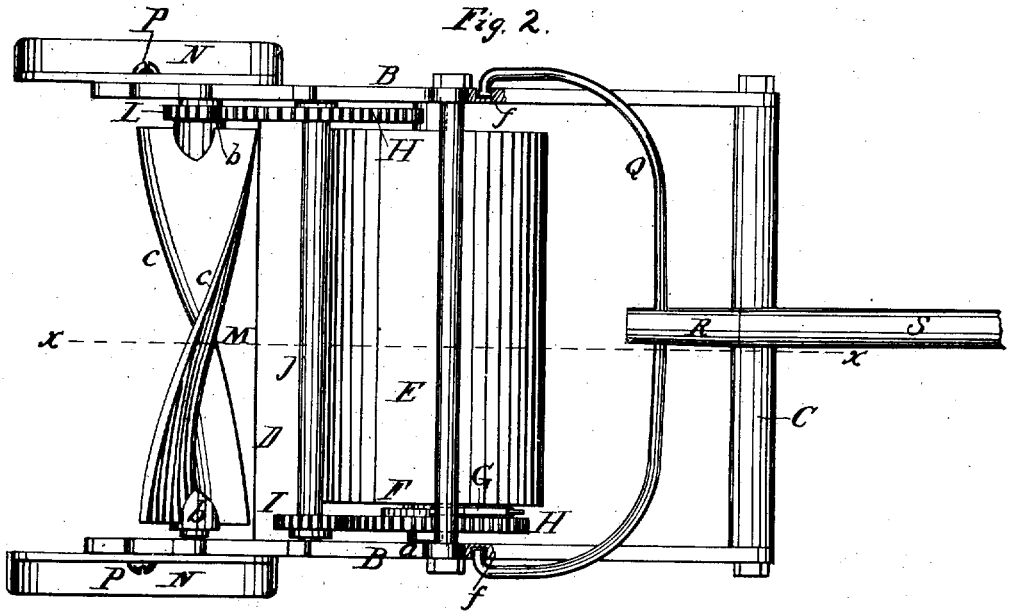

Figure 1 is a side sectional view of my invention, taken in the line *x x*, fig. 2.

Figure 2, a plan or top view of the same.

Figure 3:
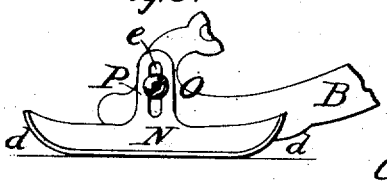

Figure 3, a side view of one of the shoes pertaining to the same, and a portion of the framing to which the shoe is attached.

Similar letters of reference indicate corresponding parts in the several figures.

The frame of the machine is composed of two side-pieces, B B, connected, at their rear ends, by a cross-bar, C, and connected, near their front ends, by a fixed cutter-bar, D, which may be of wrought or cast-iron, faced with steel at its upper surface.

At the centre of the frame there is a shaft, *a*, the side-pieces B B serving as the bearings thereof. This shaft is allowed to turn freely in its bearings, and it has a roller, E, fitted loosely upon it.

The shaft *a* has a ratchet-wheel, F, keyed firmly upon it, into which a pawl, G, attached to one end of the roller, catches, and causes the shaft to turn with the roller when the machine is shoved forward, the shaft not being turned when the machine is drawn backward.

On the shaft *a* there is permanently keyed a toothed wheel, H, which gears into a pinion, I, on one end of the shaft J, and on said shaft, near the opposite end, there is keyed a toothed wheel, K, which gears into a pinion, L, on one of the journals *b* of the cutter M. This cutter is of cast-iron, and has two or more spiral blades *c*.

Two blades are represented in the drawings, and that number will probably be sufficient.

This spiral-bladed cutter, when the machine is shoved forward, has a rotary motion communicated to it from the roller E, through the medium of the gearing described, and the blades *c* are designed to work over the edge of the fixed cutter-bar D, as will be fully understood by referring to fig. 1.

To the front end of each side-piece B, there is attached a shoe, N.

These shoes are rounded up at each end, as shown at *d d*, and at the centres of the shoes there are vertical portions, O, which have oblong slots, *e*, in them, through which screws P pass into the side-pieces B B, as shown clearly in fig. 3.

This mode of attaching the shoes to the side-pieces admits of their being adjusted so that their fixed cutter D may be at a greater or less distance above the surface of the ground, according to the height of cut required.

Q represents a bail-shaped rod, the ends of which are curved, or bent inward, or toward each other, to form journals, *f f*, which are fitted in holes in the side-pieces B B of the framing, a little behind the ends of the roller-shaft *a*.

This rod is provided at its centre with a socket, R, to receive a wooden handle, S.

As the machine is shoved along, the cutter M, as it rotates, cuts the grass, the edges of the blades *e*, as they pass over the edge of the cutter-bar D, severing it.

The journals *f f* of the bail-shaped rod Q are allowed to work freely in the side-pieces B B, so that in pushing the machine along, said rod will not interfere in the least with the equilibrium of the frame on the shaft of roller E.

This device will operate and cut grass quite close to trees and shrubs, without injuring or cutting them. The rotary cutter M cannot spring—a result due to the material, (cast-iron,) and the spiral form in which it is cast.

The whole device complete, ready for use, may be furnished at a small cost, and there are no parts liable to get out of repair or become deranged by use.

By attaching the handle to the frame of the machine, by means of pivots or hinges, the frame, it will be seen, is allowed to adjust itself to the inequalities of surface over which it may pass, without any labor, or effort on the part of the operator. This is an important feature of the invention. The manner of constructing the rotary cutter is also important. As a cutter of this class cannot be made inflexible, or sufficiently stiff, when composed of a series of parts connected together, the blades, or cutters will spring, yield, or give, and render the operation of the machine very imperfect.

I do not claim the combination of a rotary cutter with a fixed cutter; neither do I claim, broadly, constructing the rotary cutter of cast-metal, or in one pi e; but I do claim—

1. The balanced frame on the roller E, in combination with the bail Q, to which the handle S is secured, all constructed and arranged substantially as and for the purpose set forth.

2. The spiral rotary cutter M, provided with the cutting-edges *c*, when hung above the cutter D in a frame, which is adjustable upon the shoes N, in the manner and for the purpose specified.

3. The frame, mounted on the roller E, and provided with the adjustable shoes N, rotary cutter M, fixed cutting-blade D, bail Q, and handles S, all operating substantially as and for the purpose set forth.

AMARIAH M. HILLS.

Witnesses:

A. R. HAIGHT,
H. L. WATTENBERG.